(12) United States Patent
Yasuda et al.

(10) Patent No.: US 9,568,020 B2
(45) Date of Patent: Feb. 14, 2017

(54) BLOWER

(75) Inventors: Masanori Yasuda, Okazaki (JP); Koji Ito, Nagoya (JP); Shinya Murayama, Kariya (JP); Kouhei Nakamura, Gamagori (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 530 days.

(21) Appl. No.: 14/123,660

(22) PCT Filed: May 24, 2012

(86) PCT No.: PCT/JP2012/003381
§ 371 (c)(1),
(2), (4) Date: Dec. 3, 2013

(87) PCT Pub. No.: WO2012/164878
PCT Pub. Date: Dec. 6, 2012

(65) Prior Publication Data
US 2014/0105744 A1    Apr. 17, 2014

(30) Foreign Application Priority Data

Jun. 3, 2011 (JP) .................................. 2011-125175
Jun. 3, 2011 (JP) .................................. 2011-125176

(51) Int. Cl.
*F04D 29/26* (2006.01)
*F04D 29/66* (2006.01)
(Continued)

(52) U.S. Cl.
CPC ........... *F04D 29/662* (2013.01); *F04D 17/105* (2013.01); *F04D 17/12* (2013.01); *F04D 17/162* (2013.01);
(Continued)

(58) Field of Classification Search
CPC ...... F04D 17/12; F04D 17/105; F04D 17/162; F04D 17/164; F04D 29/281; F04D 29/661; F05D 2260/96; F16F 15/363
See application file for complete search history.

(56) References Cited

U.S. PATENT DOCUMENTS 2,771,240 A * 11/1956 Gurin ..................... F01D 5/027
                                                                301/5.22
3,744,929 A *  7/1973 Huntington ............. F04D 29/26
                                                                416/145
(Continued)

FOREIGN PATENT DOCUMENTS

DE         3413388 A1      10/1985
JP         S50-059545       5/1975
(Continued)

OTHER PUBLICATIONS

Office action dated May 20, 2014 in corresponding Japanese Application No. 2011-125175.
(Continued)

*Primary Examiner* — Ninh H Nguyen
(74) *Attorney, Agent, or Firm* — Harness, Dickey & Pierce, P.L.C.

(57) ABSTRACT

A blower includes a fan that causes momentum to air by rotation, a shaft that defines a rotation axis of the fan, a bearing that supports the shaft outside of the fan, and a weight that is movable in a direction of rotation of the fan. In the fan, the weight is located opposite to the bearing with respect to an end of the fan adjacent to the bearing, and thus an increase in weight by the weight can be reduced.

14 Claims, 9 Drawing Sheets

(51) Int. Cl.
 *F04D 17/12* (2006.01)
 *F04D 17/16* (2006.01)
 *F04D 17/10* (2006.01)
 *F04D 29/28* (2006.01)
 *F16F 15/36* (2006.01)

(52) U.S. Cl.
 CPC ........... *F04D 17/164* (2013.01); *F04D 29/281* (2013.01); *F16F 15/363* (2013.01); *F05D 2260/96* (2013.01)

(56) References Cited

U.S. PATENT DOCUMENTS

| | | | |
|---|---|---|---|
| 3,970,260 A | | 7/1976 | Bruggisser et al. |
| 5,256,037 A | * | 10/1993 | Chatelain .............. F04D 29/662 310/51 |
| 6,213,717 B1 | * | 4/2001 | Bucher ................. F04D 25/088 415/119 |
| 7,717,679 B2 | | 5/2010 | He |
| 8,133,009 B2 | * | 3/2012 | Salvesen ............... F04D 29/282 415/118 |
| 2009/0004007 A1 | | 1/2009 | Sakai et al. |

FOREIGN PATENT DOCUMENTS

| | | |
|---|---|---|
| JP | S58-032999 A | 2/1983 |
| JP | S63-098498 U | 6/1988 |
| JP | 2005-094983 A | 4/2005 |
| JP | 2009-030587 A | 2/2009 |

OTHER PUBLICATIONS

Office action dated May 20, 2014 in corresponding Japanese Application No. 2011-125176.

International Search Report and Written Opinion of the ISA for PCT/JP2012/003381, mailed Aug. 14, 2012.

\* cited by examiner

FIG. 3A    FIG. 3B    FIG. 3C $\omega=0$ $\omega<\omega c$ $\omega>\omega c$

BLOWER

CROSS REFERENCE TO RELATED APPLICATIONS

The present disclosure is a 371 National Phase application, based on PCT/JP2012/003381, filed May 24, 2012, which claims priority to and is based on Japanese Patent Application No. 2011-125175 filed on Jun. 3, 2011, and Japanese Patent Application No. 2011-125176 filed on Jun. 3, 2011, the disclosures of which are incorporated herein by reference.

TECHNICAL FIELD

The present disclosure relates to a blower equipped with a weight for balance adjustment.

BACKGROUND ART

In a conventional blower, a balance adjustment was performed by adding a balance weight to a fan (plus balance adjustment) or removing a surplus weight (minus balance adjustment) for cancelling vibrations between the fan and a motor as a rotating body. For example, patent document 1 discloses a centrifugal blower in which the minus balance adjustment is performed.

Patent document 2 discloses an electric blower in which the balance adjustment is automatically performed by arranging a weight to be movable between a fan and a washer that fixes the fan. According to the conventional art of the patent document 2, there is a merit that the time and effort of the balance adjustment in a manufacturing process decrease. However, because the weight of the rotating body increases due to the weight, there is a possibility that an efficiency of the blower deteriorate.

PRIOR ART DOCUMENTS

Patent Documents

[Patent Document 1] JP-A-2009-30587
[Patent Document 2] JP-A-2005-94983

SUMMARY OF INVENTION

It is an object of the present disclosure to provide a blower, which is capable of reducing an increase in weight due to a weight.

According to a first aspect of the present disclosure, a blower includes a fan that causes momentum to air by rotating, a shaft that defines a rotation axis of the fan, a bearing that supports the shaft outside of the fan, and a weight that is movable in a direction of rotation of the fan, and in which the weight is disposed in the fan at a position opposite to the bearing with respect to an end of the fan adjacent to the bearing.

According to this, a distance from the bearing to the weight can be increased, as compared with a case where the weight is located between the fan and the bearing. Therefore, the effect of balance adjustment by the weight can be effectively exerted. Accordingly, an increase in weight due to the weight can be reduced.

BRIEF DESCRIPTION OF DRAWINGS

The above and other objects, features and advantages of the present disclosure will become more apparent from the following detailed description made with reference to the accompanying drawings, in which like parts are designated by like reference numbers and in which.

EMBODIMENTS FOR CARRYING OUT INVENTION

First Embodiment

Figure 1:
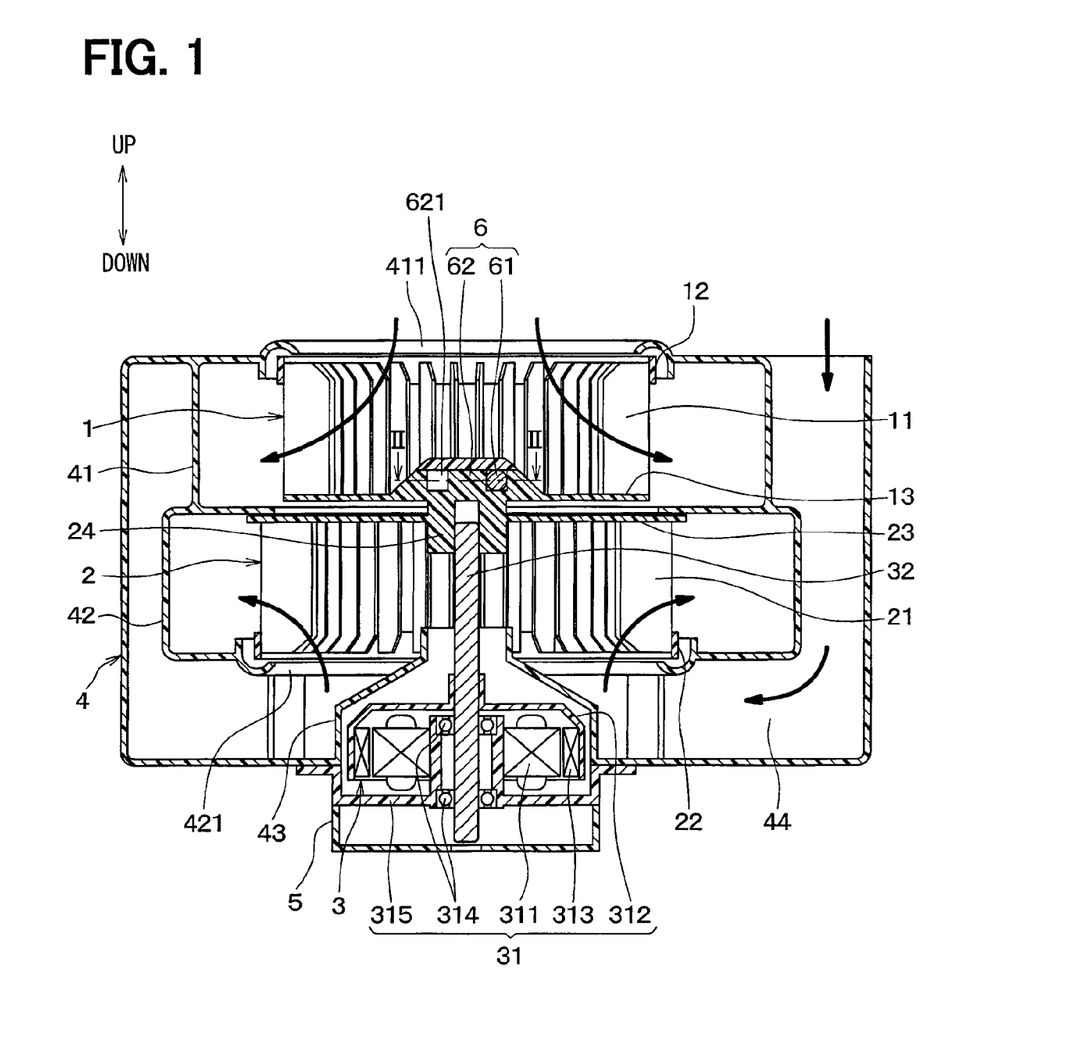
FIG. 1 is a cross-sectional view of a blower according to a first embodiment.

A first embodiment will be hereinafter described. A blower shown in FIG. 1 is used for an interior unit (not shown) of a vehicular air conditioning apparatus. The blower draws an outside air and an inside air introduced by an inside and outside air switching box of the interior unit, and blows the drawn air toward an air conditioning unit of the interior unit. In FIG. 1, up and down arrows denote directions in a state where the blower is mounted in a vehicle.

The blower is an inside and outside air two layer-type blower that can separately draw a compartment outside air (outside air) and a compartment inside air (inside air). The blower includes a first fan 1, a second fan 2, an electric motor 3, a casing 4 and the like.

The first fan 1 and the second fan 2 are multi-blade centrifugal fans that blow air in a centrifugal direction when rotatably driven by the electric motor 3. The first fan 1 and the second fan 2 are coaxially arranged. In the state where the blower is mounted in the vehicle, the first fan 1 is located higher than the second fan 2. In this example, the first fan 1 and the second fan 2 are integrally formed with a resin.

The electric motor 3 includes a motor body portion 31, and a shaft 32 that projects from the motor body portion 31. The shaft 32 serves as a rotation shaft of the first fan 1 and the second fan 2. In the state where the blower is mounted in the vehicle, the shaft 32 extends in the up and down directions. The motor body portion 31 is located lower than the first fan 1 and the second fan 2, in the state where the blower is mounted in the vehicle.

The casing 4 includes a first scroll portion 41 accommodating the first fan 1, a second scroll portion 42 accommodating the second fan 2, a motor accommodation portion 43 accommodating the motor body portion 31 of the electric motor 3.

The first scroll portion 41 is formed with a first suction opening 411 that opens at an end (on a side opposite to the electric motor 3) with respect to a fan axial direction. The first scroll portion 41 is formed with a bell-mouth at an outer rim portion of the first suction opening 411. The bell-mouth extends toward the inside of the first fan 1. Inside of the first scroll portion 41, a scroll-shaped passage is formed to collect the air blown out from the first fan 1.

The second scroll portion 42 is formed with a second suction opening 421 that opens at the other end (on a side adjacent to the electric motor 3) with respect to the fan axial direction. The second scroll portion 42 is formed with a bell-mouth at an outer rim portion of the second suction opening 421. The bell-mouth extends toward the inside of the second fan 2. Inside of the second scroll portion 42, a scroll-shaped passage is formed to collect the air blown out from the first fan 1.

Inside of the casing 4, an introducing passage 44 for introducing the air to the second suction opening 421 is formed outside of the second scroll portions 41, 42.

The motor accommodation portion 43 is formed by recessing a wall of the casing 4 toward the second suction opening 421.

The first fan 1 has a structure in which a plurality of plate-shaped vane portions 11 (blades) is arranged around the rotation axis. Ends of the plurality of vane portions 11 adjacent to the first suction opening 411 are connected through a side plate 12, and the opposite ends of the plurality of vane portions 11 are connected through a main plate 13.

The side plate 12 is formed into a ring shape so as to serve as a hoop that fastens the plurality of vane portions 11 from an outer periphery of the first fan 1. The main plate 13 is formed into a disc shape to cover the plurality of vane portions 11 from the bottom (opposite to the suction opening) of the first fan 1.

In this example, the side plate 12 has a straight shape parallel to the fan axial direction in a cross section. The side plate 12 may have a substantially arc shape along a flow line of a main flow passing between the vane portions 11 in cross-section so that a cross-sectional area of the air passage defined between the vane portions 11 reduces from a radially inside of the fan toward a radially outside.

The second fan 2 also has a structure in which a plurality of plate-shaped vane portions 21 (blade) is arranged around the rotation axis, similar to the first fan 1. Ends of the vane portions 21 of the second fan 2 adjacent to the second suction opening 421 are connected through a side plate 22 having a hoop shape, and the opposite ends of the vane portions 21 of the second fan 2 are connected through a main plate 23 having a disc shape.

The main plate 23 is formed with a cylindrical boss 24 at a center to which the shaft 32 of the electric motor 3 is connected. The boss 24 is connected to a central portion of the main plate 13 of the first fan 1.

The motor body portion 31 of the electric motor 3 includes a core 311, a rotor 312, a magnet 313, bearings 314, a center piece 315, and the like. The core 311 is fixed to the casing 4 through the center piece 315. The two bearings 314 are fixed to the center piece 315. The two bearings 314 support the shaft 32 outside of the first fan 1 and the second fan 2. The rotor 312 is fixed to the shaft 32. The magnet 313 is fixed to the rotor 312.

The casing 4 is equipped with a motor cover 5 so as to protect motor components, such as the shaft 32, the bearings 314, and a circuit unit (not shown), from external dust and dirt.

When the core 311 is electrically conducted by an external power supply (not shown), a change of magnetic flux occurs and a force attracting the magnet 313 occurs. Therefore, the magnet 313, the rotor 312, the shaft 32 and the fans 1, 2 are integrally rotated about a center axis of the shaft 32.

A balancer 6 is disposed in the boss 24 so as to reduce vibrations due to the rotation. Here, "disposed in the boss 24" means not only a structure where the balancer 6 is diposed in the boss 24 itself but also means a structure where the balancer 6 is disposed in an proximity of the boss 24 including the main plate 13. In particular, the balancer 6 is disposed at a center of the main plate 13 and inside of the first fan 1. In other words, the balancer 6 is disposed on a side (opposite to the motor) away from the electric motor 3 than the boss 24. Also, the balancer 6 is disposed away from the electric motor 3 than the second fan 2 (opposite to the motor with respect to the second fan 2).

The balancer 6 is a ball balancer including balls 61 (spherical-shaped weights) movable in directions of rotation of the fans 1, 2 and a ball accommodation portion 62 (weight accommodation portion). Balance is automatically adjusted as the balls 61 move in an annular accommodation space 621 formed in the ball accommodation portion 62. The accommodation space 621 is formed coaxial with the fans 1, 2.

The ball accommodation portion 62 projects in a tapered shape from the main plate 13 toward the first suction opening 411 (toward an air suction side of the first fan 1). In the example of FIG. 1, the ball accommodation portion 62 has a circular truncated cone shape. Alternatively, the ball accommodation portion 62 may have a columnar shape a corner of which has been removed (R-shaped bevel, C-shaped bevel).

In this example, the ball accommodation portion 62 is formed in such a manner that the thickness of the center portion of the main plate 13 is increased, the annular groove is formed in the thick portion, and the annular groove is covered with a cover member.

Figure 2A:
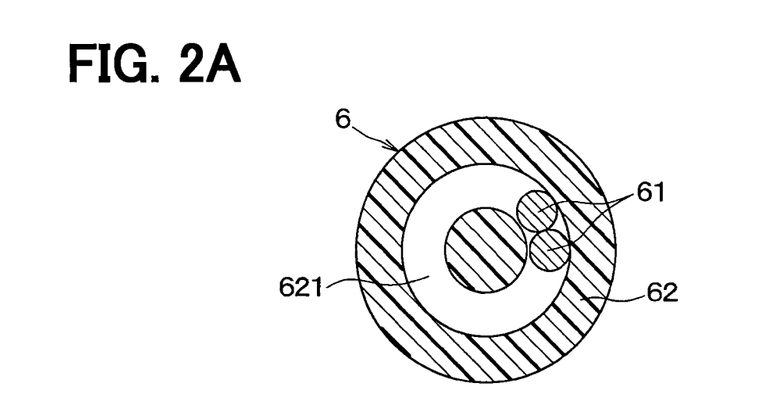
FIGS. 2A to 2C are cross-sectional views taken along a line II-II in FIG. 1.
Figure 2B:
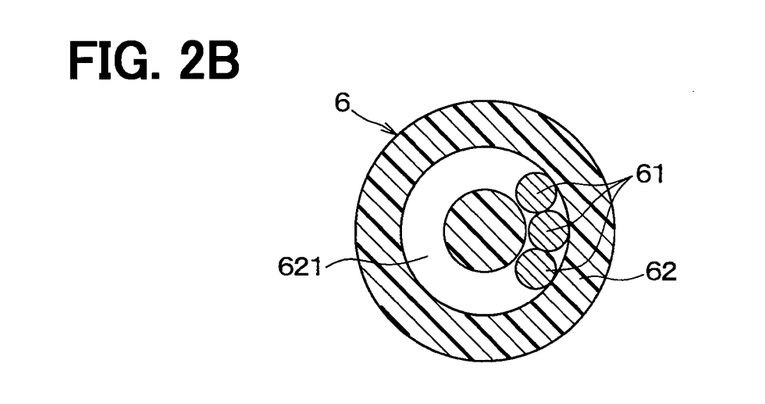
Figure 2C:
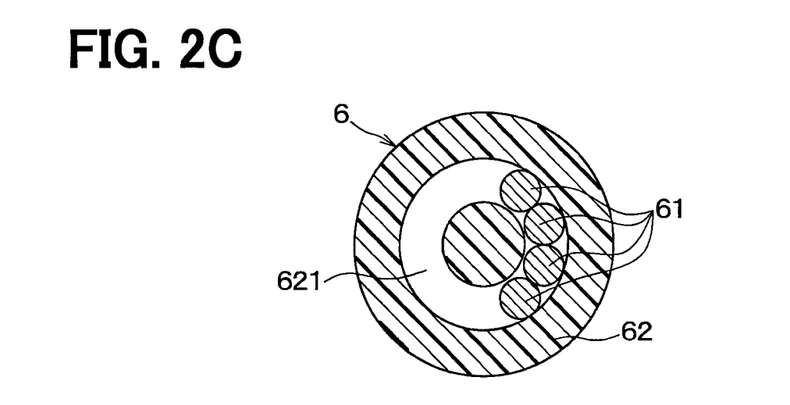

FIGS. 2A to 2C are cross-sectional views taken along a line II-II in FIG. 1. The balls 61 can freely move (roll) in the accommodation space 621. FIG. 2A shows an example where two balls 61 are used. FIG. 2B shows an example where three balls 61 are used. FIG. 2C shows an example where four balls 61 are used.

Next, an operation in the above-described structure will be described. When the electric motor 3 rotates the fans 1, 2, the vane portions 11, 21 of the fans 1, 2 cause momentum to the air. With this, air is suctioned from the suction openings 411, 421 of the scroll portions 41, 42, and blown out from the outer peripheral portions of the fans 1, 2. The air blown out is collected to the scroll-shaped passages of the scroll portions 41, 42, and is introduced to the air conditioning unit (not shown) from discharge openings (not shown) of the scroll portions 41, 42.

Figure 3A:
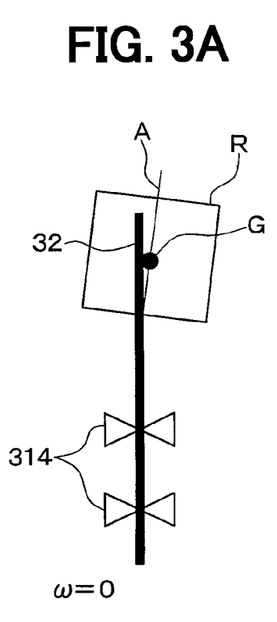
FIGS. 3A to 3C are diagrams illustrating a structure of the blower shown in FIG. 1 as a simple model.
Figure 3B:
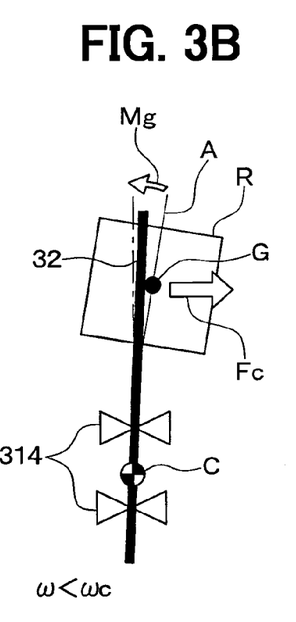
Figure 3C:
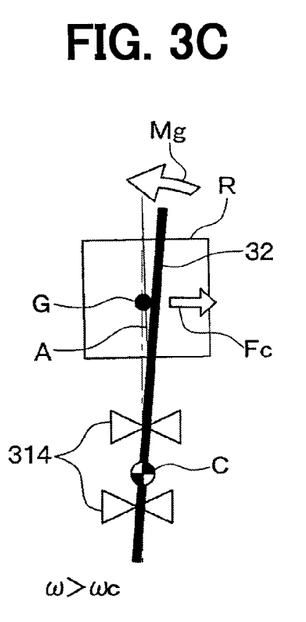

Here, rotation balance of the fans 1, 2 will be described. FIGS. 3A to 3C show brief models of the structure described above. FIG. 3A illustrates a stationary state (rotation speed $\omega=0$) of a rotation unit R composed of the fans 1, 2, the shaft 32, the rotor 312 and the magnet 313. FIG. 3B illustrates a state where the rotation speed $\omega$ of the rotation unit R is lower than a critical speed $\omega c$ ($\omega<\omega c$). FIG. 3C illustrates a state where the rotation speed w of the rotation unit R is greater than the critical speed $\omega c$ ($\omega>\omega c$).

As shown in FIG. 3A, a main axis A of inertia of the rotation unit R, which is composed of the fans 1, 2, the shaft 32, the rotor 312 and the magnet 313, has a small misalignment from the center axis of the shaft 32. This small misalignment is caused by a manufacturing error or the like.

As shown in FIGS. 3B and 3C, therefore, a moment occurs due to a centrifugal force Fc caused by rotation of the rotation unit R. With this, a support member (center piece 315 in the example of FIG. 1) supporting the bearings 314 is deformed, and the shaft 32 turns around centering on a specific point C between the two bearings 314 in a state where the center axis of the shaft 32 is inclined.

As shown in FIG. 3B, in the state where the rotation speed $\omega$ (number of rotation) of the rotation unit R is lower than the critical speed $\omega c$, the moment due to the centrifugal force Fc is greater than a gyroscopic-moment Mg. Therefore, the gravity center G and the main axis A of inertia turn around outside of the center axis of the shaft 32. In other words, the gravity center G and the main axis A of inertia are located opposite to an imaginary center axis of the shaft 32 where the rotation speed is $\omega=0$ and the shaft 32 is not inclined (a single-dashed chain line of FIG. 3B) with respect to the center axis of the actual shaft 32 inclined.

On the other hand, as shown in FIG. 3C, in the state where the rotation speed $\omega$ (number of rotation) of the rotation unit R is greater than the critical speed $\omega c$, the gyroscopic-moment Mg is greater than the moment due to the centrifugal force Fc. Therefore, the gravity center G and the main axis A of inertia are located inside of the center axis of the shaft 32. In other words, the gravity center G and the main axis A of inertia are located between the center axis of the actual shaft 32 inclined and the imaginary center axis of the shaft 32 where the rotation speed is $\omega=0$ and the center axis is not inclined (single-dashed chain line in FIG. 3C).

In this case, the balls 61 of the balancer 6 are automatically arranged to positions balanced with the gravity center G due to the centrifugal force. Therefore, the balls 61 of the balancer 6, the gravity center G and the main axis A of inertia have a balanced positional relationship. Therefore, a range of vibration of the shaft 32 is reduced, and the vibrations can be reduced.

Further, since the balancer 6 is disposed in the fan boss portion away from the bearings 314, a distance from the center C of inclination of the shaft 32 to the balls 61 can be increased. Therefore, the balance adjustment effect by the balls 61 can be effectively exerted.

In addition, the weight is increased by the balancer 6. Therefore, the gyroscopic-moment Mg increases with the increase in the moment of inertia around the center C of inclination. As such, the vibrations at the number of rotation over the critical speed can be further reduced. Moreover, since the balancer 6 is disposed in the fan boss portion away from the bearings 314, the moment of inertia can be effectively increased with a small increase in weight.

Figure 4:
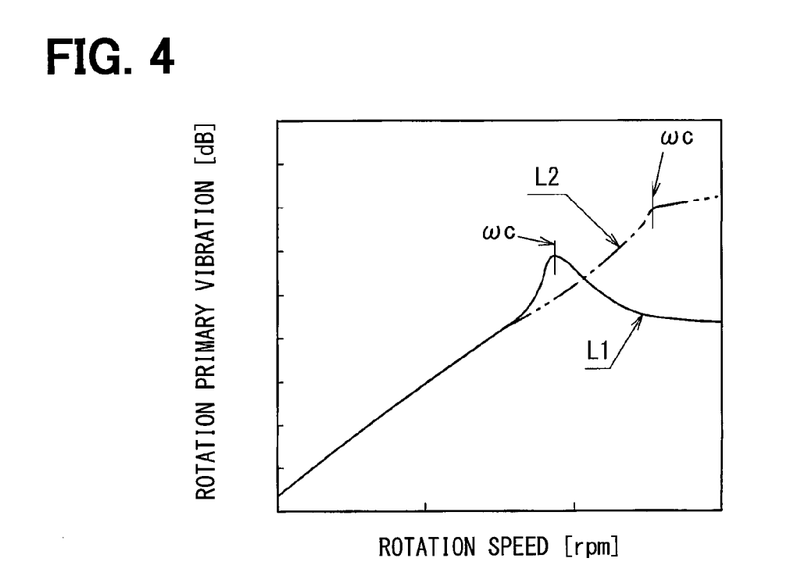
FIG. 4 is a graph illustrating a vibration reduction effect according to the first embodiment.

FIG. 4 illustrates an example of the vibration reduction effect achieved by the present embodiment. In FIG. 4, a comparative example L2 illustrates vibrations in a blower without having the balancer 6. As it can be known from FIG. 4, in the present embodiment L1, the critical speed $\omega c$ reduces and the vibrations at the rotation speed w greater than the critical speed $\omega c$ reduces, as compared with the comparative example L2.

In the present embodiment, further, the balancer 6 is disposed at the fan boss portion (in an area where the flow of air is relatively weak). Therefore, an increase in noise of blown air due to the balancer 6 disturbing the air flow by the first fan 1 and the second fan 2 (air flow from the suction openings 411, 421 toward the fan outer periphery) can be reduced. In addition, the balancer 6 can be effectively arranged by effectively using the space inside of the fan.

Further, the ball accommodation portion 62 has a circular truncated shape that narrows toward the air suction opening 24 of the first fan 1. Therefore, the flow of air by the first fan 1 can be adjusted by the ball accommodation portion 62, and thus the noise of blown air can be reduced.

Moreover, the balancer 6 is disposed opposite to the bearings 314 with respect to the second fan 2. With this, since the distance from the bearings 314 to the balancer 6 can be further increased, an increase in weight due to the balancer 6 can be further reduced.

Second Embodiment

Figure 5:
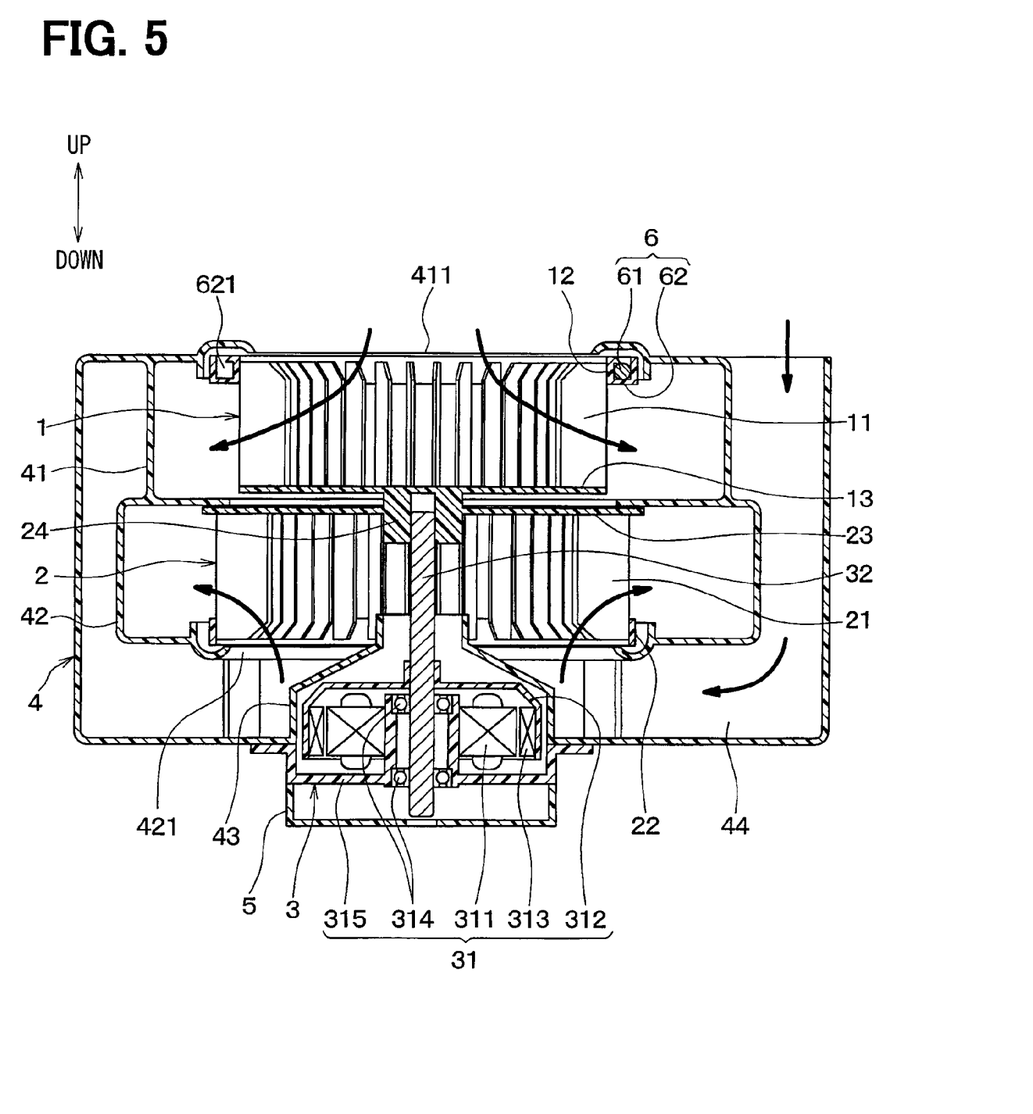
FIG. 5 is a cross-sectional view of a blower according to a second embodiment.

In the first embodiment described above, the balancer 6 is disposed at the fan boss portion (in the proximity of the boss 24). In the second embodiment, on the other hand, the balancer 6 is disposed in the side plate 12 of the first fan 1 (upper peripheral portion of the fan), as shown in FIG. 5. In other words, in regard to the position of the balancer 6 with respect to the fan axial direction, the balancer 6 is located opposite to the bearings 314 with respect to the end of the side plate 12 adjacent to the bearings 314. In regard to the position of the balancer 6 with respect to a fan radial direction, the balancer 6 is located outside of the vane portions 11 with respect to the fan radial direction. In this example, the ball accommodation portion 62 is kept on a rear side of the bell-mouth of the first scroll portion 41. In particular, the ball accommodation portion 62 is provided by the annular groove formed on the side plate 12. Further, a turned edge is provided at the annular groove so as to restrict the balls 61 from dropping out from the annular groove.

Similar to the first embodiment shown in FIGS. 2A to 2C, the balls 61 can freely move (roll) in the accommodation space 621.

Also in the present embodiment, the advantageous effects similar to the first embodiment shown in FIGS. 3A to 3C and FIG. 4 can be achieved. Further, the balancer 6 is disposed at an upper portion of the first fan 1 away from the bearings 314. Therefore, the distance from the center C of inclination of the shaft 32 to the balls 61 can be further increased, as compared with the first embodiment described above. As such, the ball adjustment effect by the balls 61 can be further effectively exerted, and the moment of inertia can be further increased. Therefore, the vibrations can be further effectively reduced.

In the present embodiment, further, the balancer 6 is located outside of the vane portions 11 with respect to the fan radial direction. That is, the balancer 6 is disposed in the area where the air flow is weak.

Therefore, the increase in noise of blown air due to the balancer 6 disturbing the air flow by the first fan 1 and the second fan 2 (the air flow from the suction openings 411, 421 toward the fan outer periphery) can be reduced. In addition, the balancer 6 can be effectively arranged by effectively using the space inside of the casing.

Third Embodiment

Figure 6A:
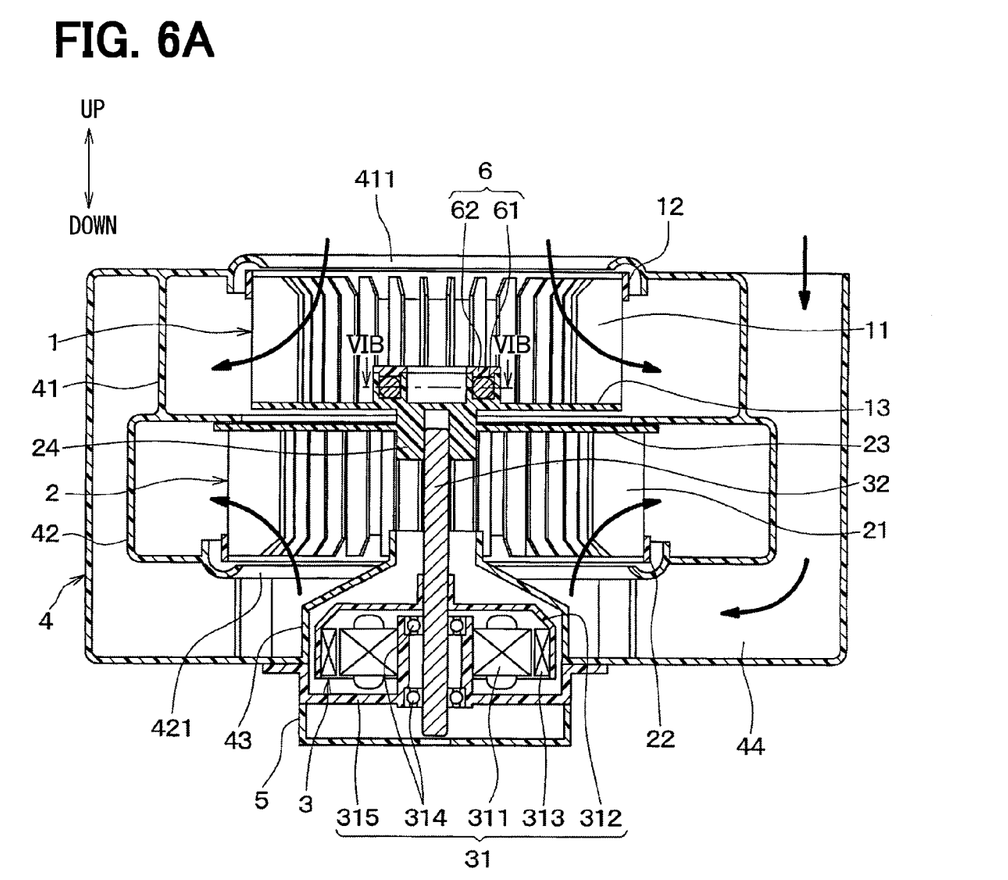
FIG. 6A is a cross-sectional view of a blower according to a third embodiment.
Figure 6B:
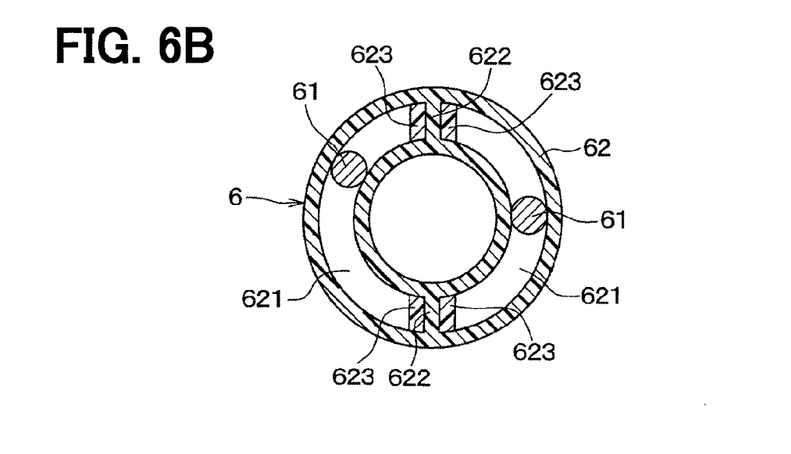
FIG. 6B is a cross-sectional view taken along a line IVB-IVB of FIG. 6A.

In the third embodiment, the accommodation space 621 is divided by separation portions 622 in a circumferential direction into spaces with the number same as the number of the balls 61. The balls 61 are accommodated in the divided spaces one by one. In addition, elastic members 623 are fixed to the walls of the separation portions 622.

In the present embodiment, the impact due to collision of the balls 61 can be alleviated by the separation portions 622 and the elastic members 623. Therefore, in a case where the balls 61 have unstable behavior at the critical speed, the increase in vibrations due to the balls colliding with each other or with the separation portions 622 can be reduced.

Fourth Embodiment

Figure 7:
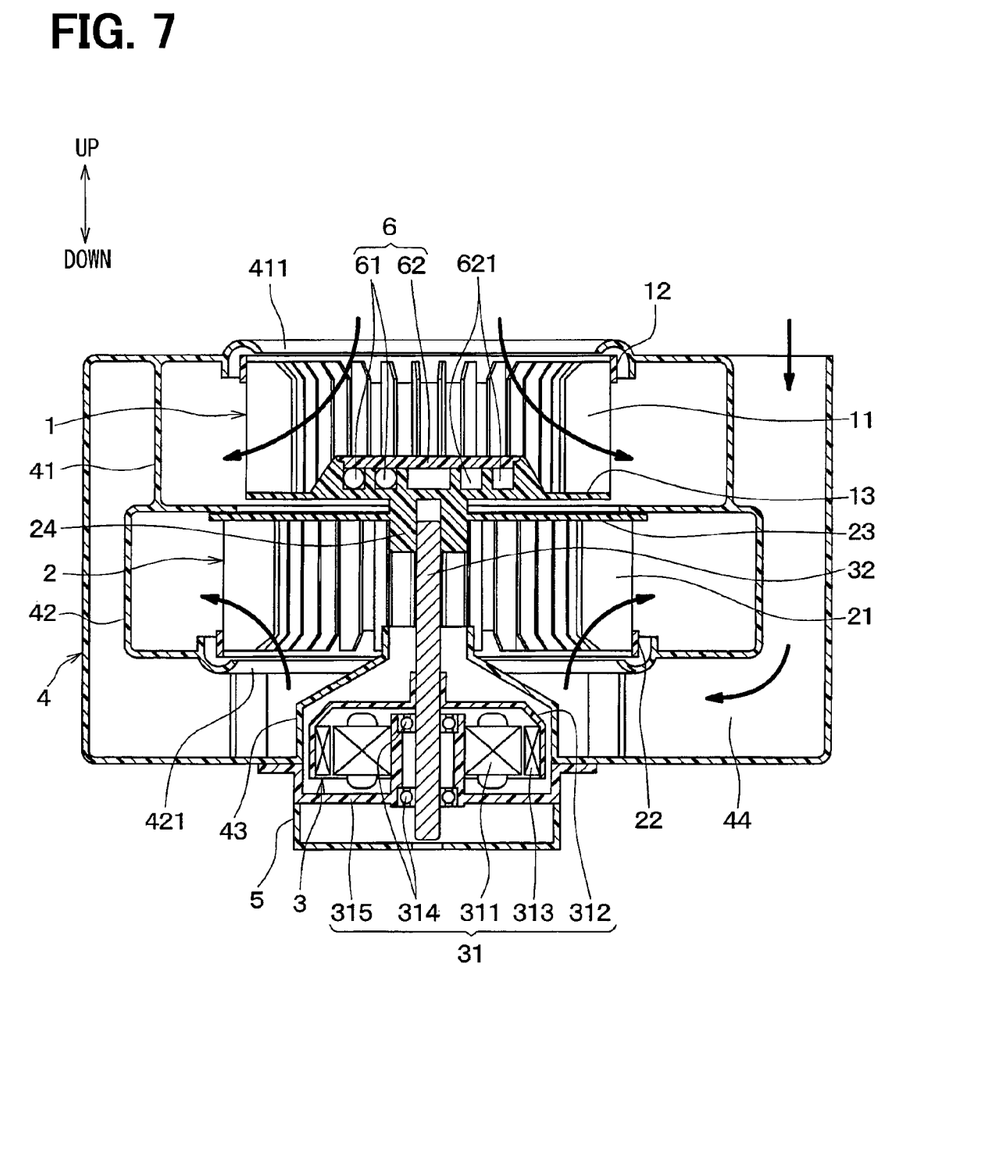
FIG. 7 is a cross-sectional view of a blower according to a fourth embodiment.

In the third embodiment described above, the accommodation space 621 is divided in the circumferential direction of the fan. In the fourth embodiment, the accommodation space 621 is divided in the radial direction of the fan, as shown in FIG. 7. Therefore, it is less likely that the balls 61 will collide with each other.

Fifth Embodiment

Figure 8:
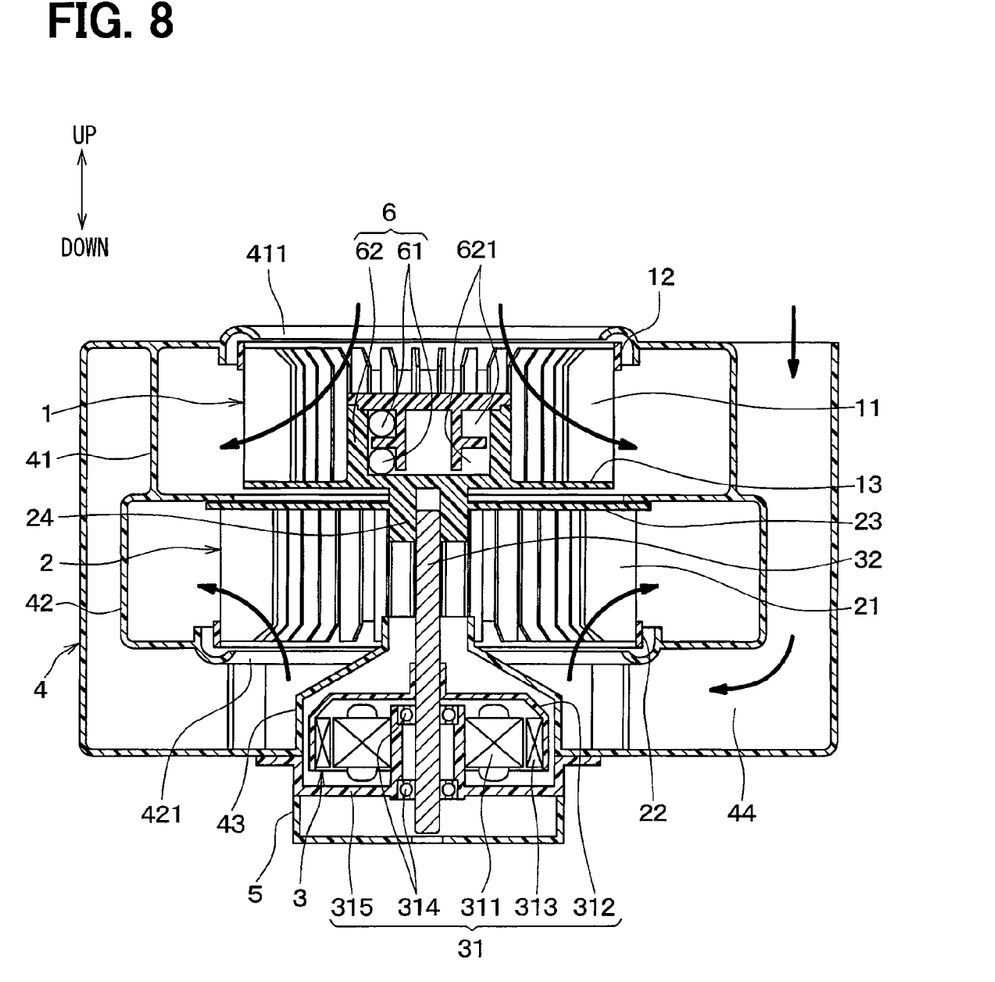
FIG. 8 is a cross-sectional view of a blower according to a fifth embodiment.

In the third and fourth embodiments described above, the accommodation space 621 is divided in the circumferential direction of the fan or the radial direction of the fan. In the fifth embodiment, the accommodation space 621 is divided in the fan axial direction, as shown in FIG. 8. Therefore, it is less likely that the balls 61 will collide with each other.

Sixth Embodiment

Figure 9:
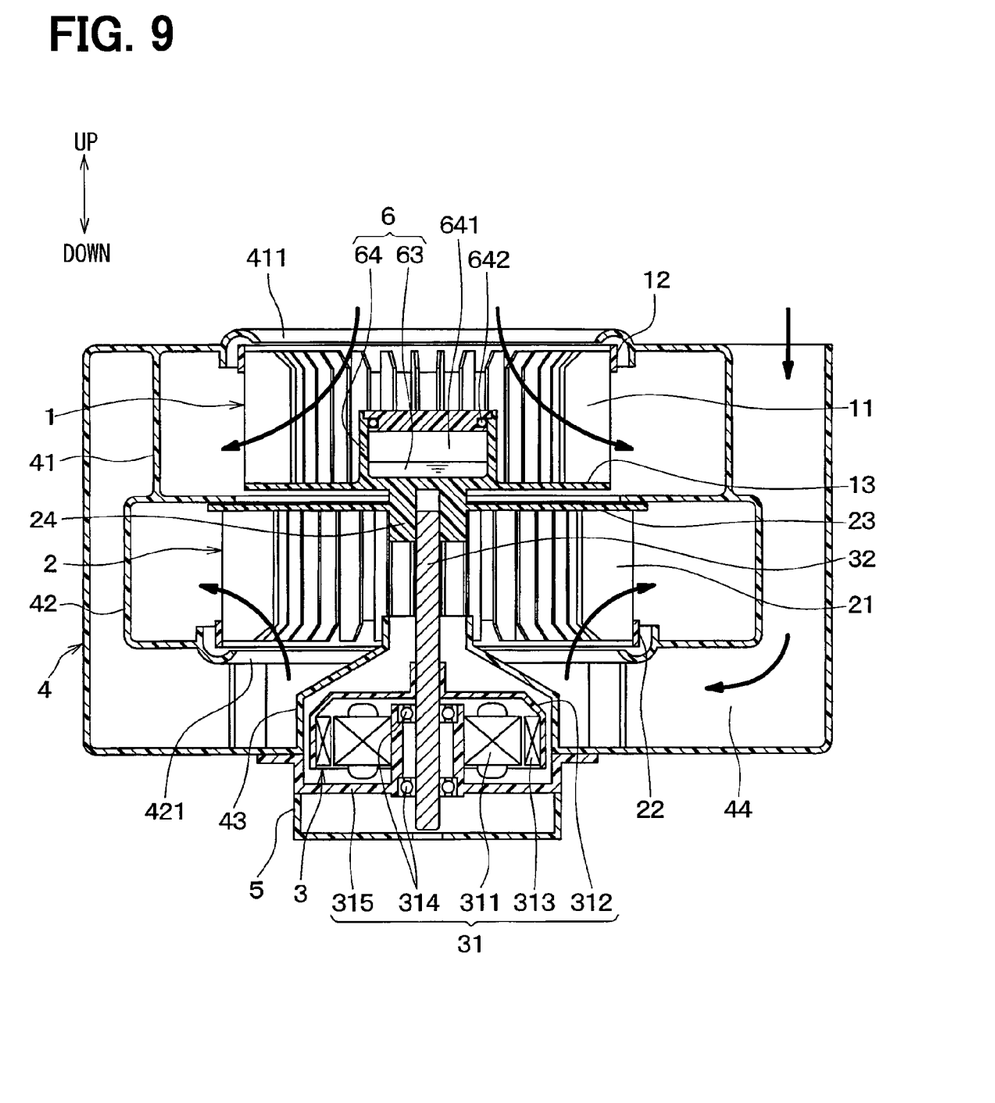
FIG. 9 is a cross-sectional view of a blower according to a sixth embodiment.

In the first to fifth embodiments described above, the balancer 6 is provided by the ball balancer. In the sixth embodiment, the balancer 6 is provided by a fluid balancer composed of a fluid 63 as the weight and the fluid accommodation portion 64 (weight accommodation portion) accommodating the fluid 63.

The balance is automatically adjusted as the fluid 63 moves in a cylindrical accommodation space 641 formed in the fluid accommodation portion 64. The accommodation space 641 is formed coaxial with the fans 1, 2.

In this example, the fluid accommodation portion 64 is constructed in such a manner that the cylindrical portion is formed at the center of the main plate 13 and the opening portion of the cylindrical portion is covered with a covering member. An O-ring 642 is arranged on the covering member so as to hermetically seal the accommodation space 641.

Also in the present embodiment, the vibrations can be reduced by the balance adjustment effect of the balancer 6.

Seventh Embodiment

Figure 10A:
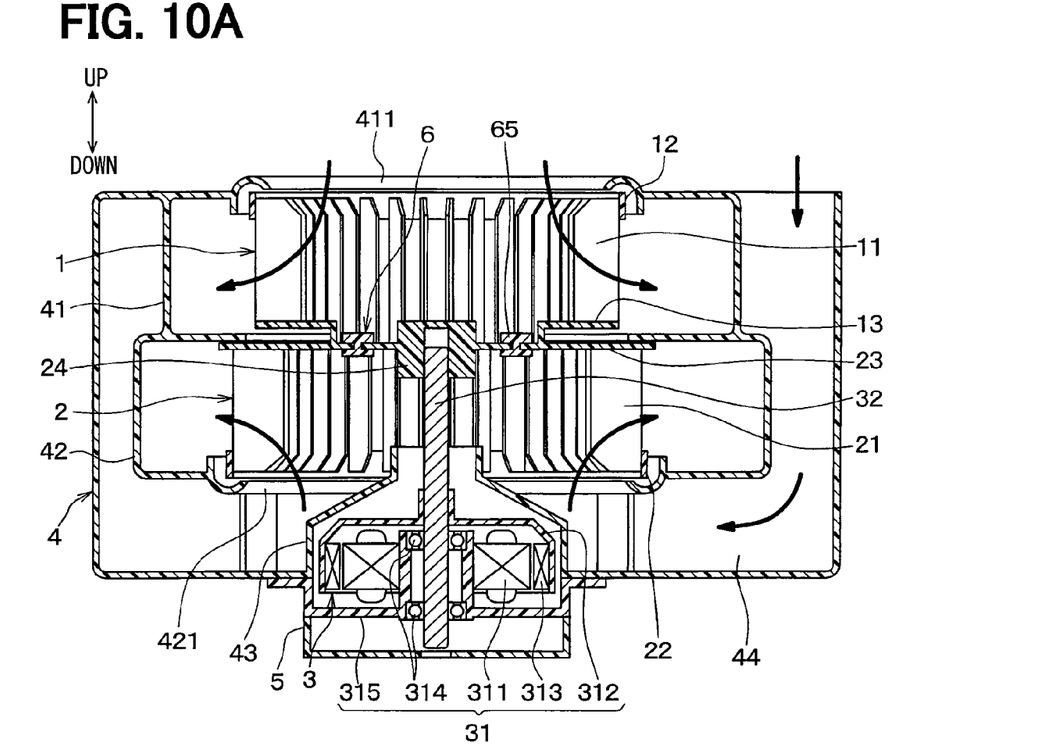
FIG. 10A is a cross-sectional view of a blower according to a seventh embodiment.
Figure 10B:
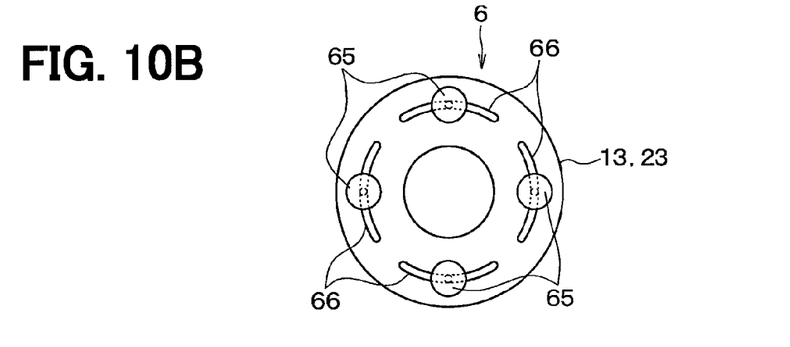
FIG. 10B is a plan view when a balancer disposed in a main plate shown in FIG. 10A is viewed along an axial direction.
Figure 10C:
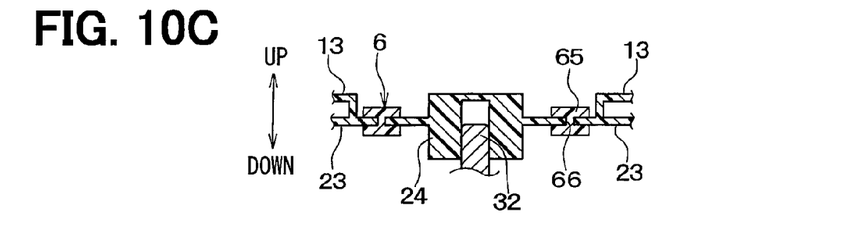
FIG. 10C is a cross-sectional view of the balancer shown in FIG. 10A.

In the seventh embodiment, as shown in FIGS. 10A to 10C, the balancer 6 is composed of grooves 66 formed in the main plates 13, 23 and weights 65 slidable along the grooves 66.

In this example, multiple grooves 66 are formed, and the weight 65 is disposed each of the grooves 66. The grooves 66 have an arc shape coaxial with the fans 1, 2.

In addition, in this example, a central portion of the main plate 13 of the first fan 1 is depressed toward the second fan 2, and is integral with the main plate 23 of the second fan 2. The grooves 66 are formed at portions where the main plates 13, 23 are integrated.

In the present embodiment, the balance adjustment effect can be achieved as the weights 65 move in the regions where the grooves 66 are formed.

Also in the present embodiment, the increase in noise of blown air due to the balancer 6 disturbing the flow of air by the first fan 1 and the second fan 2 (the flow of air from the suction openings 41, 42 toward the fan outer peripheral portion) can be reduced. The balancer 6 can be effectively arranged by effectively using the space inside of the fan.

In the present embodiment, a cover covering the balancer 6 may be provided, and the flow of air (the flow of air from the suction openings 41, 42 toward the fan outer peripheral portion) may be adjusted by the cover.

Other Embodiments

In the second embodiment described above, the balancer 6 is disposed outside of the vane portions 11 with respect to the radial direction of the fan. However, the balancer 6 may be disposed outside of radially inside ends of the vane portions 11 with respect to the radial direction of the fan. Also in this case, the increase in noise of the blown air due to the balancer 6 can be reduced.

Further, in the second embodiment described above, similar to the third embodiment described above, the accommodation space 621 may be divided into spaces with the number same as the balls 61 in the fan circumferential direction, and the balls 61 may be accommodated in the divided spaces one by one. Further, elastic members may be disposed on the walls of the separation portions of the accommodation space 621. As such, since the impact of collision by the balls 61 can be alleviated by the elastic members, the increase in vibrations due to the collision of the balls 61 or the collision of the balls 61 and the separation portions can be reduced in the case where the balls 61 have unstable behavior at the critical speed. Similar to the fourth and fifth embodiments described above, the accommodation space 621 may be divided in the fan radial direction or the fan axial direction.

Further, in the second embodiment described above and the like, similar to the sixth embodiment described above, the balancer 6 may be provided by the fluid balancer composed of the fluid as the weight and the fluid accommodation portion (weight accommodation portion) accommodating the fluid.

In each of the embodiments described above, the weights of the balancer 6 may be provided by micro granular bodies (sand granules). However, the micro granular bodies are preferably dry (without moisture or stickiness) not to adhere with each other.

Moreover, the balancer 6 may be a pendulum type balancer. That is, the weight of the balancer 6 may be provided by a pendulum that rotates about the center axis of the shaft 32.

The fans 1, 2 are not limited to the multi-blade centrifugal fans, but may be any type of fans such as an axial flow fan or a circulating fan. That is, also by the various types of fans other than the multi-blade centrifugal fans, the increase in weight can be reduced by increasing the distance from the bearings to the weight. Further, the increase in noise of the blown air due to the weight can be reduced by arranging the weight to the proximity of the boss where the flow of air is relatively weak.

The blower is not limited to the inside and outside air two layer type blower, but may be a single layer blower having a single fan.

The present disclosure has been described with reference to the embodiments. However, the present disclosure should not be limited to the embodiments and the structures thereof. The present disclosure should include various changes and modifications within an equivalent range. In addition, various combinations or modes, any combinations and modes including a combination of a single element and more or less should be included in the scope of the disclosure and the scope of idea.

The invention claimed is:

1. A blower comprising:
    a fan causing momentum to air by rotating;
    a shaft defining a rotation axis of the fan;
    a bearing supporting the shaft outside of the fan; and
    a weight being movable in a direction of rotation of the fan, wherein
    the fan is a multi-blade centrifugal fan including a plurality of vane portions arranged around the rotation axis, a main plate connecting the vane portions at a first end of the fan, and a side plate connecting the vane portions adjacent to a second end of the fan from radial outside of the fan, the second end of the fan being further from the bearing than the first end of the fan in an axial direction,
    the fan defines an air suction opening at the second end, and
    the weight is disposed inside of the fan adjacent to the first end of the fan, and at a position opposite to the bearing with respect to the main plate in the axial direction and between the rotation axis of the fan and radial inside ends of the vane portions in a radial direction of the fan.
2. The blower according to claim 1, wherein
    the fan has a boss to which the shaft is connected adjacent to the first end, and the weight is disposed in the boss.
3. The blower according to claim 1, wherein
    the weight is held in a groove formed in the main plate.
4. The blower according to claim 1, comprising:
    a weight accommodation portion accommodating the weight, wherein
    the weight accommodation portion projects from the main plate toward an air suction side of the fan.
5. The blower according to claim 4, wherein
    the weight accommodation portion has a shape tapering off toward the air suction side of the fan.
6. The blower according to claim 4, wherein
    the weight accommodation portion includes an annular accommodation space formed therein, the annular accommodation space being formed coaxially with the fan.
7. The blower according to claim 4, wherein,
    the weight accommodation portion has a circular truncated cone shape.
8. The blower according to claim 1, wherein
    the weight is slidable in a groove formed in the main plate.
9. The blower according to claim 1, wherein
    the fan is a first fan,
    the blower further comprising a second fan, wherein
    the first fan is located opposite to the bearing with respect to the second fan, and
    the weight is disposed in the first fan.
10. The blower according to claim 1, wherein
    the weight further comprises a plurality of spherically shaped weights.
11. The blower according to claim 10, wherein
    the plurality of spherically shaped weights further comprise two spherically shaped weights.
12. The blower according to claim 10, wherein
    the plurality of spherically shaped weights further comprise three spherically shaped weights.
13. The blower according to claim 10, wherein
    the plurality of spherically shaped weights further comprise four spherically shaped weights.
14. The blower according to claim 1, wherein
    the weight is disposed inside of the fan adjacent to the first end of the fan, and at a position opposite to the bearing with respect to the main plate in the axial direction and directly adjacent to the rotation axis of the fan.

* * * * *